(50.) STEPHEN CHESTER. 4 Sheets--Sheet 1.

Improvement in Electro-Magnetic Apparatus for Noting Meteorological Changes.

No. 122,437. Patented Jan. 2, 1872.

Witnesses
Inventor
Stephen Chester (50.) STEPHEN CHESTER. 4 Sheets--Sheet 2.
Improvement in Electro-Magnetic Apparatus for Noting Meteorological Changes.
No. 122,437. Patented Jan. 2, 1872.
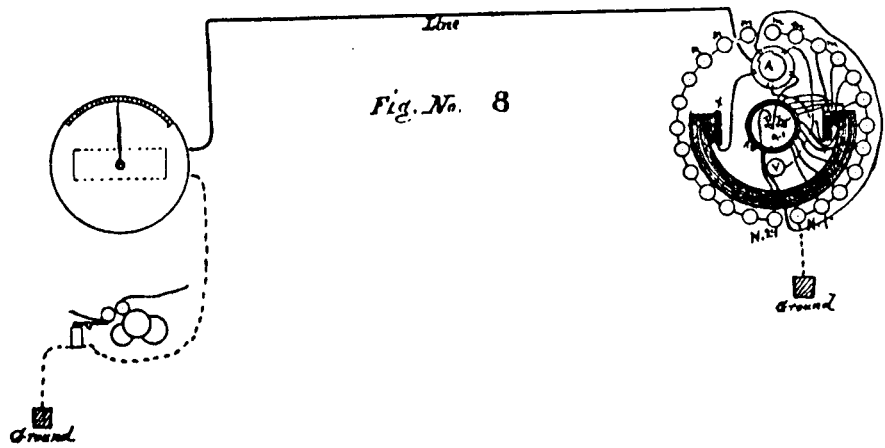
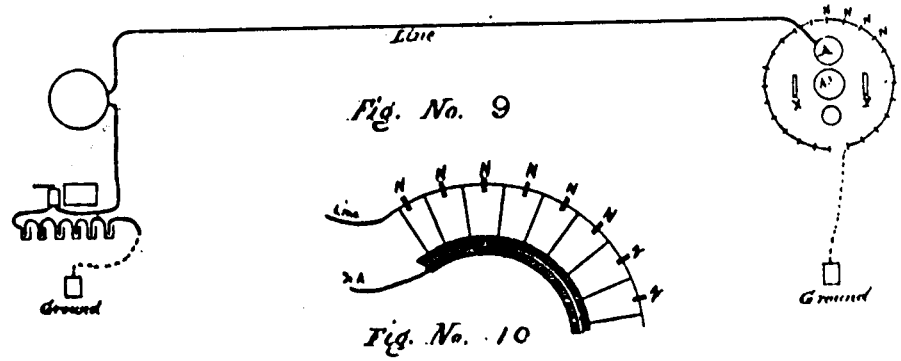
Witnesses
J. A. Stebbins
& E. Smith
Inventor
Stephen Chester (50.) STEPHEN CHESTER. 4 Sheets--Sheet 3.
Improvement in Electro-Magnetic Apparatus for Noting Meteorological Changes.
No. 122,437. Patented Jan. 2, 1872.
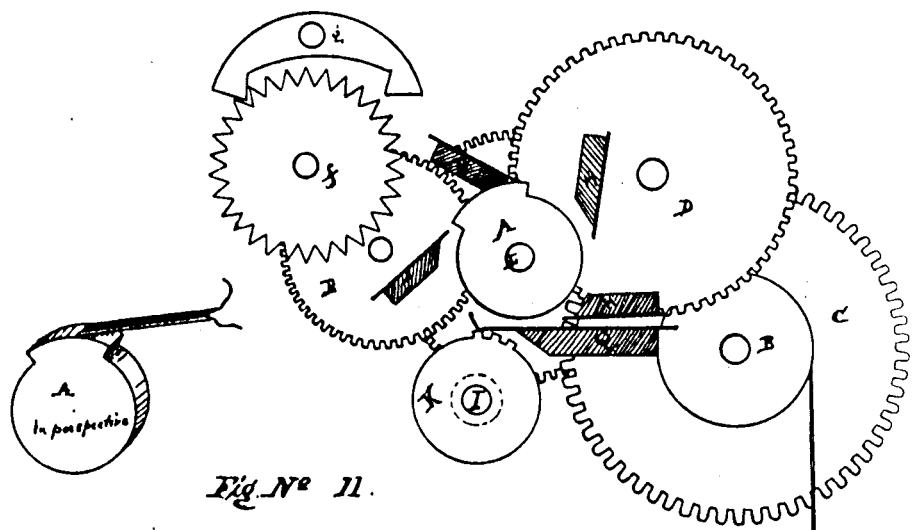
Fig. Nº 11.
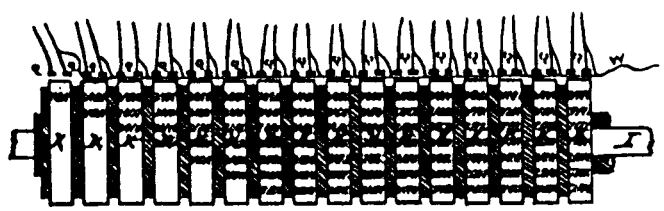
Fig. Nº 12
Witnesses
Inventor (50.) STEPHEN CHESTER. 4 Sheets--Sheet 4.
Improvement in Electro-Magnetic Apparatus for Noting Meteorological Changes.
No. 122,437. Patented Jan. 2, 1872.
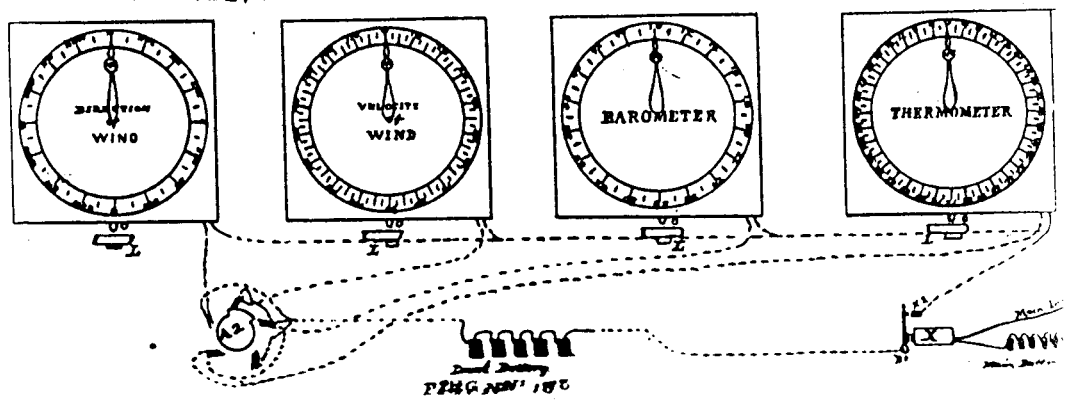
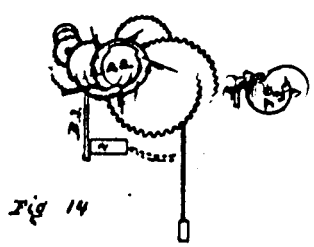
Fig 14
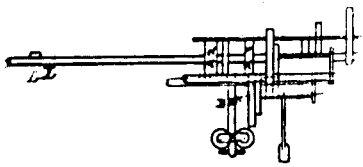
Fig 15
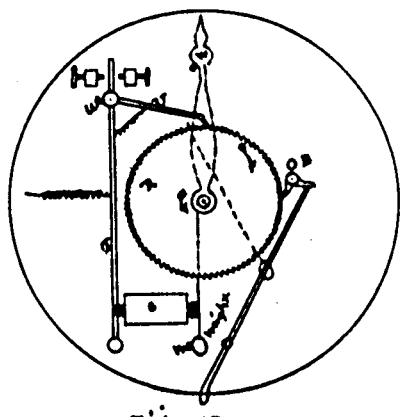
Fig. 16
Witnesses
P. A. Stebbins
Inventor
Stephen Ch...

122,437

UNITED STATES PATENT OFFICE.

STEPHEN CHESTER, OF ELIZABETH, NEW JERSEY.

IMPROVEMENT IN ELECTRO-MAGNETIC APPARATUS FOR NOTING METEOROLOGICAL CHANGES.

Specification forming part of Letters Patent No. 122,437, dated January 2, 1872.

*To all whom it may concern:*

Be it known that I, STEPHEN CHESTER, of the city of Elizabeth and State of New Jersey, have invented a new "System of Automatic Meteorological Telegraph," of which the following is a specification:

My invention consists of a series of apparatus for receiving and transmitting to distant points by telegraph-wires records of the direction and velocity of the wind, the condition of the barometer and thermometer, and, if desirable, the amount of rain, &c.

For facility and clearness of description the several parts of the combined apparatus will be separately described, in the following order: First, the apparatus for measuring and transmitting, or recording at a distant point, the "direction of the wind." Secondly, the apparatus for measuring and recording at a distant point the "velocity of the wind." Thirdly, the apparatus for recording at a distant point the condition of the barometer. Fourthly, that which records at a distance the thermometrical condition. Fifthly, the apparatus by which these several apparatuses are caused, in rotation, to perform their functions through and by means of a single telegraph-wire. Sixthly, seventhly, eighthly, and ninthly, the several instruments, respectively, for receiving the described records; and, finally, the apparatus by which the several transmitting instruments are caused to perform their functions upon their respective and appropriate receiving instruments.

The first instrument consists of a vane, so mounted that when placed in an unsheltered position it will easily be made to point in that direction toward which the wind is blowing, and thus cause the shaft or tower to which it is attached to turn in correspondence.

Figure 1:
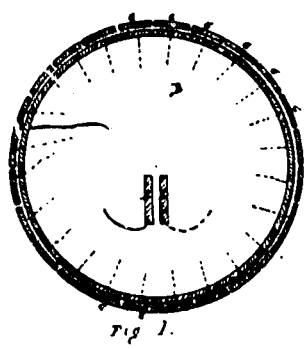
Figure 3:
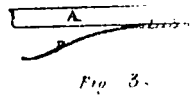
Figure 4:
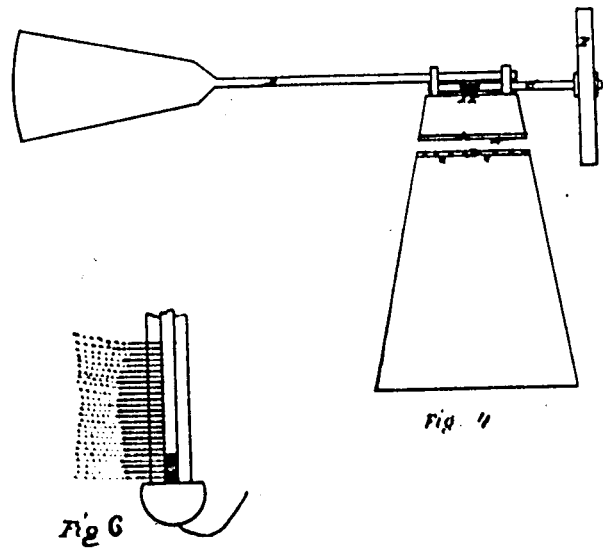

In Fig. 4, on Sheet No. 1, this vane is represented together with a tower, one section of which—the tower—is supposed to be immovable, while the upper section is supposed to revolve as the vane moves in one direction or the other. Upon the lower or fixed section are placed two concentric rings of metal, (see also Figure 1, Sheet 1,) marked, in Figs. 1 and 4, B. These rings are flat on their upper surfaces and in the same plane, and are carefully insulated from each other, and one of them is divided into a number of equal parts, also separated from each other by a non-conducting substance of electricity. A wire leads from the solid ring, and other wires from each of the parts of the divided or broken ring to other parts of the apparatus. On the under surface of the upper section of the tower, (A in Figs. 2, 3, and 4,) is placed a flat elastic piece of metal, P, in such manner that when the upper part of tower revolves the end of this flat piece of metal P describes a circle, its end resting partly upon the solid ring and partly upon the broken ring, thus establishing a metallic connection between the solid ring and one or the other of the parts of the divided ring, corresponding with the direction in which the vane D may point. Supposing the broad end of the vane be pointing due south, and let that point of the divided ring upon which the end of piece of metal P then rests be considered as zero, and let there be three hundred and sixty equal parts in the divided ring, numbered toward the right. Then, if the broad end of vane move one degree toward the west (from south) the solid ring and wire connected therewith will be connected with piece No. 1 of the divided ring and the wire connected with it. If pointing 2° or 3° west of south No. 2 or No. 3 of divided ring will be thus connected with solid ring. Thus, if an electric current be passing through wire connected with the solid ring it will find its outlet through the wires respectively connected with pieces of broken ring, No. 1, 2, 3, or 4, as the large end of vane may be pointing 1°, 2°, 3°, 4°, or any other number of degrees, west of south.

Next in order of description is the apparatus for causing the "velocity of wind" to be recorded.

Figure 2:
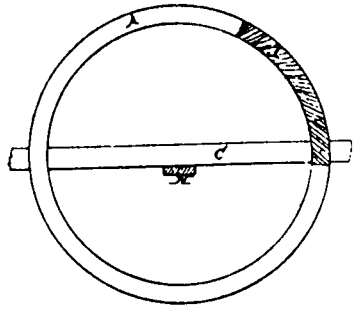
Figure 5:
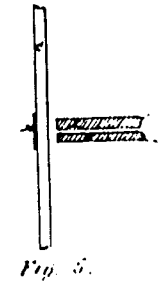

On the small end of the vane, or on that side of rotary tower which is caused by the vane to constantly present itself toward the direction from which the wind blows, is placed a "windmill," E, firmly fastened to shaft or axis C. (See Figs. 2, 4, and 5.) On shaft C is a projection or tooth of metal, H. (Figs. 2, 4, 5.) Below the shaft C, in such position as not to be touched by the shaft, but so as to be simultaneously pressed by the projection H whenever the shaft revolves, are two flat elastic pieces of metal, I I, in Figs. 1 and 5, with connecting wires leading to other parts of the apparatus. Hence a current of electricity passing through one of these wires would flow through the other when tooth H was in contact with springs I I, but the current would be instantly broken when the revolution of shaft C carried tooth H away from these springs. So if said wires were connected with voltaic battery and magnetic apparatus each revolution of windmill-shaft C would cause one magnetic impulse to be sent. If the revolution should be rapid the magnetic impulses would succeed each other rapidly. If slow these impulses would be correspondingly far apart.

Third in order is the apparatus connected with the galvanometer.

Figure 6:
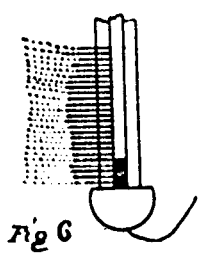

Fig. 6, on Sheet No. 1, represents a barometer, into the lower bulb or mercury-cup of which is inserted a wire—always in contact with the mercury. Other wires are inserted at distances corresponding to the graduations of the instrument, in such manner, that as the mercury rises and falls therein, the ends of a greater or less number of wires will come in contact with the mercury.

Figure 7:
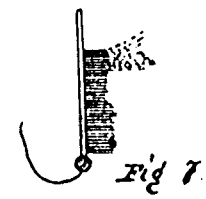

Fig. 7, in Sheet No. 1, illustrates a similar arrangement of a thermometer which performs its functions precisely in the same manner as does the barometer just described, and which therefore requires no further description.

It will also be obvious that rain or tide-gauges, instruments for measuring pressure of gas or steam, or any automatic instrument which indicates by movement of any constituent part, may be in a similar manner so arranged that a wire may be connected with one of several other wires, corresponding in each case to the graduations or divisions of the measuring instrument over which the index or movable part may pass.

Fifth in order of description is the apparatus through and by which, successively, the several diverse connections, formed by different conditions of the indices of each of the measuring instruments, shall cause corresponding, separate, and diverse records to be made upon certain corresponding electrical receiving instruments connected therewith by a single telegraph-wire with the usual batteries and fixtures. It has already been said that the several records are to be made in rotation. Hence it will be apparent that some device must be introduced by which the telegraph-wire will be successively and in rotation connected with each of the sending instruments described, for so long a time as may be required for each to perform its functions.

Fig. 11, on Sheet No. 3, represents a device for this purpose. Its essential features are a train of wheels or clock-work, propelled by weight or spring, its rapidity of movement being governed by any ordinary escapement. On the projection of any convenient shaft or axis—say L—is placed a wheel, A, having a projection or tooth, which, in this instance, embraces nearly one-fifth of the circumference of the wheel, but which in all cases would be proportionate to the number of single instruments to be successively connected. Concentric to this wheel, and equidistant from each other and the wheel, is placed a proportionate number of pairs of flat elastic pieces of metal or springs—in this case there being five. Their position is such that their ends do not touch the circumference of the wheel, but they are touched by, and the two ends of each pair are successively connected by, the projecting tooth as the wheel A is caused to rotate. On the left of Fig. 11, Sheet No. 3, is a perspective view of the wheel A with one pair of springs shown. Wires are connected with each of the flat pieces or springs. So if the several wires leading each from one of the springs composing a pair by a common conductor to one pole of a voltaic battery, and the wires leading from the other spring of each pair be severally led through separate instruments to the other pole of the same battery, then if the wheel A be caused to revolve the several instruments would be successively placed in circuit with and be affected by the battery separately, as the different pairs of springs were severally and separately connected by the projection on wheel A. For the purpose of description, let this wheel A be called a "switch-wheel," and, for illustration, let it be assumed that the speed of clock-work is such that it, A, revolves once in five minutes. Then each pair of springs have their ends connected once in five minutes, and for the space of one minute.

On the right-hand side of Fig. 8, on Sheet No. 2, is a diagram illustrating the manner in which the wires described are further connected with all parts of the apparatus. Only a sufficient number of connections are drawn to serve for illustration without creating confusion. In this diagram the central circle, marked A I, represents the two rings of the vane-tower or "direction-of-wind" apparatus. C is the windmill shaft or "velocity-of-wind" apparatus, showing the two springs I I. X and Y, respectively, represent the barometer and thermometer, described and shown in Figs. 6 and 7, on Sheet 1. The surrounding small circles marked m m m represent cups of voltaic battery successively connected with each other in one series, having its terminuses at N 1 and N 24. One of each pair of springs belonging to switch-wheel A is, through a common conductor, connected with a telegraph-wire proceeding to a distant point where it is connected with certain receiving apparatus, hereinafter to be more particularly described, and which is represented on the left hand of Fig. 8, Sheet 2.

It is, however, to be understood that this distant connection of the telegraph-wire is to one wire of an electro-magnet, the other wire of which proceeds to the ground or a return-wire. The other wire or spring of each pair surrounding "switch-wheel" is connected, respectively, to solid ring of "direction-of-wind" instrument, to one spring, I, of "velocity-of-wind" instrument, to the mercury-bulb or immovable part of barometer, to thermometer, and to point V, hereafter to be described. Hence, if switch-wheel A be caused to revolve, as before described, it is evident that the five instruments will, in succession, each be connected by the telegraph-wire to the receiving instrument or instruments for one minute, and this will be constantly repeated so long as wheel A revolves. In the case now being illustrated the receiving instruments may be one instrument known as a galvanometer, and one resembling what is known as a "Morse telegraph register," both in one and the same circuit. Commencing with the "direction-of-wind" instrument it will be observed that one pole of the commencement of battery N1 is connected with ground, and a wire leads from the other pole of cup No. 1 to piece No. 1 of broken ring of "direction-of-wind" machine; from further pole of cup No. 2 to piece No. 2, and from further pole of cup 24 to piece 24, and so on. Hence, if the upper or revolving part of vane-tower be in such position that spring P connects solid ring with piece 2, 3, 4, or 20, of broken ring, then an electric circuit will be formed through telegraph-line springs of switch-wheel A, through spring P, through 2, 3, 4, or 20 cups of battery, as the case may be, through ground and galvanometer, which would be caused to deflect by a battery force of such number of cups which corresponded with the number of piece of broken ring then connected with solid ring by spring P. As the deflection of galvanometer (all other conditions being the same) will be greater or less in direct proportion to the number of cups of battery introduced into the circuit affecting it, then the deflection of galvanometer would in each case indicate how many cups were then connected, or on what piece of broken ring spring P was resting, or in what direction vane was pointing. Now, suppose the switch-wheel A has passed forward, so that projecting tooth has left the first pair of springs, and now connects the second pair, and has thus brought the velocity of wind instrument into operation. From the second spring I a wire leads to the last cup of battery N24. Hence, if tooth H of windmill shaft O (Sheet 1) come in contact with springs I I, the circuit through galvanometer and magnet of Morse register, and whole number of cups of battery will be closed, but will be broken when tooth H leaves springs I I. Therefore each revolution of windmill will cause one closure or electric impulse through those instruments. Each such impulse being registered by a dot impressed upon a paper moving with uniform velocity, then the proximity of such dots would indicate the rapidity with which the electric impulses were sent, or the rapidity with which the windmill revolved, or the velocity of the current of wind causing it to revolve. The several wires coming from the barometer and thermometer respectively are likewise similarly connected with successive cups of battery in such manner that when the switch-wheel A connects one or the other of these instruments the connection will in either case be complete through a greater or less number of cups of battery, as the mercury stands in position to cover a greater or less number of wires. It is obvious that any number of instruments for divers purposes may thus be introduced into one system, as, for instance, for measuring and recording the rise and fall of tide, fall of rain, pressure of wind, steam, or gases—the operation of which, being essentially similar to that of one of the instruments described, need no further mention. In the case now being illustrated the circle V in Fig. 8, Sheet 2, represents a wheel similar to switch-wheel A, revolving five times as fast. The office of this wheel is to connect in rotation 1 2 3 4 5 cups of battery through the whole series during the interval of time that the fifth or last pair of springs is connected by switch-wheel A. Thus, every five minutes the galvanometer is deflected by a known rotation of battery power, and thus the unit of deflection for every change in condition of line is constantly known, so that in the immediately succeeding three or four evolutions the relative value of galvanometer deflections may be known. The plan and means of utilizing the several parts of instrument described, just shown, will in many cases be the most simple and economical; but in many cases the connecting telegraph-lines would be subject to so many variations of condition, of conductibility or leakage, that the galvanometrical indications, even corrected by intermediate observations, as described, would fail to record with the mathematical exactness desired at all times. I will therefore describe two other methods, each applicable to any, but peculiarly adapted to particular conditions. In the above-described method the battery is placed at the transmitting end, where there is supposed to be no attendant to attend to the supply and condition of battery. Hence a battery of very long endurance must be used. In the second method now to be described all the battery force is to be placed at the receiving end, under the care of the general attendant of the receiving office. This is illustrated in Fig. 9, Sheet 2, in which all parts of the line and apparatus are represented in a similar manner to that in Fig. 8, except that in the former case (Fig. 9) the points N N N do not represent separate cups of battery, but separate coils of fine insulated wire or other resistances. The several connections of all the transmitting instruments with switch-wheel A, and with each of the series of resistance-coils in the series, is precisely as before described for the connection of the several cups of battery, except that in the one case the number of cups connected is in direct proportion with the graduation marked by transmitting machine, and in the other the number of resistance-coils connected is in inverse proportion. The highest graduation marked would connect the least number of resistances. As has been stated, a uniform battery is constantly in connection with line and at receiving end. Hence, as a greater or less graduation is in turn marked by any of the transmitting instruments inversely, the current must pass through a less or greater number of resistance-coils, or through a circuit embracing a shorter or greater length of wire, and the galvanometer deflections at receiving end will be in direct proportion. The operation of "velocity-of-wind" instrument will be precisely as before, and needs no further description. Fig. 10, Sheet 2, represents a section of the two rings of "velocity-of-wind" instrument on an enlarged scale, showing more clearly the connection of the several "resistances" N N N with each other and with the several pieces of broken ring The function of wheel V in this case is precisely similar to that described in the former case—that is, during the interval that switch-wheel A connects the appropriate pair of springs, the wheel V causes connection to be made in rotation through the greatest number of resistance-coils downward through the series until the telegraph-wire is directly connected. The object of this need not be repeated. The third method of application now to be described is especially adapted to long lines, subject to changes of conducting conditions, as the records are not dependent upon strength or quality of electric current traversing the telegraph-line, but upon the number of electric impulses of any available power transmitted through the line in uniform or regular intervals of time. This requires a modification of the clock-work of apparatus, causing switch-wheel A to revolve, and also entirely different receiving apparatus. I will first explain the transmitting apparatus. In Fig. No. 11, on Sheet No. 3, just below the switch-wheel A, will be observed another wheel, K, on shaft I, having projecting teeth, which, when revolving, impinge upon the ends of springs placed on insulated blocks similar in all respects to those surrounding wheel A; but K is intended to represent one of a series of similar wheels, all placed on one shaft, and turning together as one wheel or cylinder. These wheels have in succession one, two, three teeth, the last having a number of teeth equal to the greatest number of parts or graduations to be indicated by any one transmitting instrument. The block and spring Q represent a series of pairs of springs, corresponding in number and position to the wheels K, each pair being connected by the several teeth of the wheel opposite when revolving. Hence, in one revolution of shaft I, each pair of springs will be connected and disconnected as many times as there are teeth on the opposite wheel. Fig. 12, Sheet No. 3, gives a longitudinal view of shaft I with several wheels K, on which the shaded parts indicate the projecting teeth, and the ends of pairs of springs Q are shown. One of the springs of each pair Q is, by a common conductor, (W, Fig. 12,) connected with the ground of transmitting end. The remaining wire of each pair of springs Q Q Q is attached by one branch to one of the pieces of broken ring of direction of wind machine; by other branches to the different graduations of thermometer, barometer, or other measuring instrument, the spring opposite one toothed wheel, K, connecting with piece No. 1, or graduation No. 1—in each case the springs of the several wheels connecting the appropriate number of graduation on the several instruments corresponding to the number of teeth on respective circuit-wheels. The connection of these several instruments with the switch-wheel A and with the telegraph-line having been already described in former cases, need not be repeated.

The shaft I is so geared that it will make an entire revolution while projection of wheel A is passing over one set of springs, H. In this illustration it makes five revolutions while A revolves once, or makes one revolution while each instrument is connected with line. Hence, supposing the direction of wind instrument to be connected, and that the vane was in such position that spring P rested upon No. 15 of broken ring, then this connecting with springs opposite circuit-wheel K having fifteen teeth, and the other end of line being connected with appropriate battery, electro-magnet, and ground, the circuit would be entire at all points except between the two springs Q alluded to, (pair 15,) and this break would be closed whenever a tooth touched the ends of springs, or in one revolution of shaft I the circuit would be closed and broken fifteen times, causing a corresponding vibration or movement of electro-magnet at receiving end. As it has been assumed that this shaft revolves once in a minute, then there will be fifteen movements of magnet in a minute; but if the position of vane is such that spring P rests upon piece of broken ring No. 2, 4, 20, or any other number, then, being thus connected with spring opposite wheel having 2, 4, 20, or any other corresponding number of teeth, there will be two, four, twenty, or a corresponding number of movements of receiving-magnet in one minute. So each instrument, the thermometer, galvanometer, or any other, (except the "velocity-of-wind" instrument, the movements and operation of which have been described,) being in turn connected, the graduation marked by the index of each respectively, causing a connection to be made through the springs opposite circuit-wheel having a number of teeth to the graduation marked, will cause a corresponding number of movements on receiving-magnet during one revolution of circuit-wheel shaft, or in one minute. It is evident that, this being accomplished, an intelligible record of the graduation or position of the index of each instrument is given at the receiving end, since a greater or less number of pulsations of the magnet in a given time clearly, and exactly indicate the corresponding position of the several indices of the measuring instruments, each in turn; but for convenience in receiving these records, apparatus may be especially adapted to their reception, which I describe as follows:

On sheet No. 4, Fig. 13, in the right-hand lower corner, is shown the main battery, section of telegraph-line, relay-magnet in circuit with armature-bar, &c., &c. This magnet X receives the impulses from the several transmitting instruments, as just described, and it now remains to utilize the pulsations caused thereby.

In Fig. No. 13 the four diagrams respectively marked "direction of wind," "velocity of wind," "barometer," and "thermometer," represent the tops of four boxes with dial-faces and hands. Fig. 15 is a diagram of the apparatus contained in each of these boxes, which consists of a ratchet-wheel with a number of teeth corresponding to the maximum number of impulses ever to be received during one interval of connection, or during the functioning of any one of the transmitting machines. This revolves with a shaft perpendicular to face of dial, and piercing its center, so that its projecting end may carry a hand or index to mark on the dial-face the degrees of revolution made by the ratchet-wheel. A weight, W B, or its equivalent, is attached to this shaft in such manner as to cause it to revolve in the direction indicated by the whole curved arrow shown in diagram, or toward the left—that is, it would do so if not prevented by the end of pawl O B locking in teeth of ratchet. Conveniently placed to perform the functions to be described is an electro-magnet, S, with armature and armature-bar I, to which is attached, by hinge or pivot U B, the pushing-bar U, the end of which is so bent, located, and adjusted in reference to periphery of ratchet-wheel that when the armature-bar I is caused to approach the face of magnet S the end of push-bar U will rest upon face of one of the teeth of ratchet-wheel, and will propel the wheel forward for a distance equal to the length of one tooth; but when the armature-bar recedes from the face of the magnet, the retractile motion of ratchet-wheel being prevented by the pawl O B dropping into and locking with another tooth, the end of push-bar U will be drawn backward over the point of another tooth, and will engage with its face in readiness to again propel the wheel forward when the armature again approaches magnet. Hence the index or hand will be carried forward one unit of its revolution by each pulsation of the armature-bar. A suitable retracting-spring being attached to armature-bar, and magnet S being attached to proper battery, each closing and breaking of circuit would be registered by the advancement of the index-hand on the dial-face; but if the pawl O B be raised, the end escaping the ratchet-teeth, and the end of push-bar U be at the same time disengaged from ratchet-teeth, the index-hand would fly back until arrested by small projecting pin so placed as to stop it at the zero of graduation.

Fig. 14, Sheet No. 4, represents a clock-work similar to that described as belonging to the sending apparatus for causing the switch-wheel A to revolve, and, like it, has a similar switch-wheel, A², with surrounding pairs of springs. Its purpose is to cause several appropriate receiving-dials to be in rotation connected, through local circuit and battery, with relay-magnet in exact correspondence with the successive connection of the several sending instruments through the main line and battery with same relay.

As the operation of this switch-wheel A² is precisely similar to that of A, before described, no further explanation is required. But as it is necessary that the revolutions of the two switch-wheels should essentially correspond, and as exact synchronous motion cannot practically be attained, provision is made that at one point in the revolution of the two wheels they should exactly correspond, which is as follows: On the shaft which carries A² is a wheel with a single tooth, A³, shown on right hand of Fig. 14, and also in Fig. 15. Conveniently placed for the purpose is an electro-magnet, Z, with armature-bar B³, (the end of B³ is shown on right-hand side of Fig. 14,) which so terminates that when the armature is drawn toward the face of magnet Z it will occupy such position as to prevent the tooth on A³ from passing it, and will thus arrest the machine; but when the armature is allowed to recede from the magnet face, then the tooth will be suffered to escape, and the machine will recommence moving. The last pair of springs belonging to switch-wheel A, on transmitting end, is connected with wheel K, having no tooth, but having such a diameter to keep its respective springs connected through its whole revolution. The movement of the switch-wheel A² is made a little more rapid than that of A on sending end, and the tooth on wheel A³ is so placed that the machine shall be arrested just when the tooth of A² is about to leave last pair of springs and recommence on first pair of series. Hence, the teeth of both wheels A and A² being on last pair of springs, respectively, the circuit will be closed throughout the whole distance and armature-bar B³ will be in condition to engage with tooth of wheel A³, and will do so, and will arrest switch-wheel A² just as it is about to complete its revolution, which will be before switch-wheel A has arrived at the same point. But when this latter completes its revolution, thus disconnecting its last pair of springs, it will break the circuit and thus permit A² to revolve. Thus the two switch-wheels will uniformly commence each revolution almost simultaneously, and the connection of the several transmitting instruments, by means of switch A, will correspond with the simultaneous connection of appropriate dials or receiving instruments by means of switch-wheel A².

Fig. 13, on Sheet No. 4, illustrates the connection of these several dials with local battery, switch-wheel A², and relay-magnet, in which the striking of armature-bar X¹ against anvil X² closes the short circuit through local battery, and with one or the other of the dials, according to the position of switch-wheel A², to correspond with the pulsations received in magnet X caused by the appropriate sending apparatus. Hence each sending or measuring instrument, in rotation, will cause the hands or dials—in each case appropriately divided and marked in the same rotation—to move forward and indicate on their several dial-faces the corresponding position of the corresponding sending instrument at the instant of sending; but the several hands or indices will remain as thus placed, and when each round of all the instruments is completed it is requisite that all the indices or receiving-dials shall be returned to zero. In Fig. 16 a bar, ⊕, is shown, one end of which rests upon projection of pawl O B and an arm shown by dotted lines upon push-bar U, and its other end (see, also, Fig. 13) projects from front of dial in such manner that when this projecting end is pressed upon it causes the push-bar and the pawl to be raised simultaneously, and the hand will be suffered to fly back until stopped by pin at zero.

The shaft-carrying switch-wheel $A^2$ is elongated, and the instrument is so placed in reference to the position of the dials that sundry teeth projecting from the elongation of this shaft at the proper moment impinge upon the several projecting bars or wires O, thus causing the several hands to fly back to zero simultaneously just before the completion of one round, thus placing the instruments in condition for the reception of another round or signal.

So far in the above explanations it has been assumed that the clock-work carrying the two switch-wheels and circuit-wheels at sending end were in constant motion. At the receiving end this may be "wound up," as required, by the attendant receiving and noting records. At the sending end, at which there will be no attendant, the clock-work must be automatic or self-winding. As, however, there are many known devices for rendering such machines completely automatic, I have not deemed it expedient to burden these specifications with further claims or detailed explanations of the specific manner of causing the spring or weight to be wound up, further than to state the fact that the revolutions of the windmill at all times, except when engaged in recording "velocity" of wind," can be utilized to wind up the weight or spring when it has run down a certain distance. As the weight or spring may be of length to carry the apparatus twenty or thirty days, experience has shown that no calm may be feared to last so long that the movement of apparatus would cease.

I do not confine myself to the particular form of switch device, as hereinbefore shown, for causing different connections to be made through varying amounts of battery, or through different amounts of resistance, or through different circuit-closing and breaking wheels, as the form of such switches may be modified without any change of the principle involved. Nor do I confine myself to the particular form or style of anemometer, barometer, or thermometer, as described, these several forms being assumed for facility of explanation of the principles involved of causing different conditions of any number of measuring instruments to cause corresponding different conditions of electrical motive power to pass over a telegraph-line. Nor do I confine myself to the reception of these records upon the dials described, as printing instruments of similar construction, as to propulsion, may be used.

It is, in fact, probable that an aneroid barometer would be suitable for this system, and a thermometer registering through the deflection caused by unequal expansion or contraction of metals bound together, would afford a form much more easy of application to this system than is the one described for illustration.

Claims.

1. I claim an automatic apparatus, operated by electro-magnetism or electricity, for indicating at a distance meteorological and other varying phenomena.

2. I claim a current-changer, consisting of a revolving cam operated by clock-work bearing successively against a series of plates connected with the different branches of an electric circuit, as and for the purpose set forth.

3. I claim an apparatus transmitting currents of electricity, during a certain unit of time, corresponding in intensity to the variations from a fixed point during said time, of instruments indicating meteorological and other varying phenomena, as and for the purpose set forth.

4. I claim an apparatus causing electrical impulses to be transmitted during a certain unit of time corresponding in number to the variations of instruments during said time from a zero point indicating meteorological and other varying phenomena, as and for the purpose set forth.

5. I claim a combination of the commutator, a single battery, instruments indicating meteorological and other varying phenomena, substantially as described.

STEPHEN CHESTER.

Witnesses:
S. A. STEBBINS,
J. E. SMITH.

(101)